(12) United States Patent
Raupp et al.

(10) Patent No.: US 11,465,082 B2
(45) Date of Patent: Oct. 11, 2022

(54) FILTRATION ASSEMBLY FOR USE IN AFTERTREATMENT SYSTEMS FOR INTERNAL COMBUSTION ENGINES

(71) Applicant: Cummins Emission Solutions Inc., Columbus, IN (US)

(72) Inventors: Julian Nicolas Aljoscha Raupp, Waldbuettelbrunn (DE); Friedrich Johann Zapf, Karlstadt (DE); Ralf Rohrmueller, Faulbach (DE); Andreas Lannig, Erlenbach (DE); Thomas Betz, Tauberbischofsheim (DE); Kay Henning Schmidt, Lohr a. Main (DE)

(73) Assignee: Cummins Emission Solutions Inc., Columbus, IN (US)

( * ) Notice: Subject to any disclaimer, the term of this patent is extended or adjusted under 35 U.S.C. 154(b) by 66 days.

(21) Appl. No.: 16/969,664

(22) PCT Filed: Feb. 15, 2018

(86) PCT No.: PCT/US2018/018377
§ 371 (c)(1),
(2) Date: Aug. 13, 2020

(87) PCT Pub. No.: WO2019/160552
PCT Pub. Date: Aug. 22, 2019

(65) Prior Publication Data
US 2020/0398199 A1 Dec. 24, 2020

(51) Int. Cl.
*B01D 37/00* (2006.01)
*B01D 35/30* (2006.01)
(Continued)

(52) U.S. Cl.
CPC ............ *B01D 35/30* (2013.01); *F01N 3/0211* (2013.01); *B01D 2201/403* (2013.01);
(Continued)

(58) Field of Classification Search
CPC . B01D 35/30; B01D 2201/403; F01N 3/0211; F01N 3/2066; F01N 2610/02; F01N 2610/1426
(Continued)

(56) References Cited

U.S. PATENT DOCUMENTS 5,919,362 A * 7/1999 Barnes .................. B01D 35/30
                                                           210/441
7,594,516 B2 * 9/2009 Maisch ............... F16K 31/0655
                                                           137/240
(Continued)

FOREIGN PATENT DOCUMENTS

DE    10 2010 061 222        6/2012

OTHER PUBLICATIONS

International Search Report and Written Opinion issued for PCT/US2018/018377, dated May 2, 2018, 16 pages.
(Continued)

*Primary Examiner* — Jason D Shanske
(74) *Attorney, Agent, or Firm* — Foley & Lardner LLP

(57) ABSTRACT

A filtration assembly structured to filter reductant includes an outer housing and an inner housing. The inner housing is positioned within the outer housing. The inner housing is structured to contain the reductant and operable between a first state in which the inner housing has a first volume and a second state in which the inner housing has a second volume that is larger than the first volume, the inner housing including an end face. The inner housing is separated from the outer housing by a gap when the inner housing is in the first state. A volume of the gap decreases as the inner housing transitions from the first state to the second state and increases as the inner housing transitions from the second state to the first state.

18 Claims, 4 Drawing Sheets

(51) Int. Cl.
*F01N 3/021* (2006.01)
*F01N 3/20* (2006.01)
(52) U.S. Cl.
CPC ........ *F01N 3/2066* (2013.01); *F01N 2610/02* (2013.01); *F01N 2610/1426* (2013.01)
(58) Field of Classification Search
USPC .......................................................... 210/767
See application file for complete search history.

(56) References Cited

U.S. PATENT DOCUMENTS

| | | | |
|---|---|---|---|
| 2003/0209482 | A1 | 11/2003 | Klotz et al. |
| 2003/0209484 | A1* | 11/2003 | Klotz .................... B01D 35/31 210/450 |
| 2005/0263451 | A1 | 12/2005 | Kramer |
| 2006/0137332 | A1 | 6/2006 | Allgeier et al. |
| 2008/0178580 | A1* | 7/2008 | Zapf ....................... F01N 3/208 60/295 |
| 2009/0206024 | A1 | 8/2009 | Bilski |
| 2011/0023466 | A1* | 2/2011 | Branco .............. B01D 53/9431 60/286 |
| 2012/0144808 | A1 | 6/2012 | Fuchs et al. |
| 2016/0341089 | A1 | 11/2016 | Henry et al. |

OTHER PUBLICATIONS

First Office Action in Indian Patent Application No. IN 202148032511, dated Aug. 3, 2021, 5 pages.

* cited by examiner

FILTRATION ASSEMBLY FOR USE IN AFTERTREATMENT SYSTEMS FOR INTERNAL COMBUSTION ENGINES

CROSS-REFERENCE TO RELATED APPLICATIONS

The present application is a National Phase Application of PCT/US2018/018377, filed Feb. 15, 2018, the contents of which are hereby incorporated by reference in their entirety.

TECHNICAL FIELD

The present application relates generally to the field of filtration assemblies for use in aftertreatment systems for internal combustion engines.

BACKGROUND

For internal combustion engines, such as diesel engines, nitrogen oxide ($NO_x$) compounds may be emitted in the engine exhaust. To reduce $NO_x$ emissions, a reductant may be dosed into the exhaust by a dosing system. When a temperature of the reductant is at or below the freezing temperature of the reductant, the reductant may freeze, which can damage the dosing system. Accordingly, it is desirable to mitigate freezing of the reductant within the dosing system.

SUMMARY

In an embodiment, a filtration assembly is structured to filter reductant includes an outer housing and an inner housing. The inner housing is positioned within the outer housing. The inner housing is structured to contain the reductant and operable between a first state in which the inner housing has a first volume and a second state in which the inner housing has a second volume that is larger than the first volume, the inner housing including an end face. The inner housing is separated from the outer housing by a gap when the inner housing is in the first state. A volume of the gap decreases as the inner housing transitions from the first state to the second state and increases as the inner housing transitions from the second state to the first state.

In another embodiment, a filtration assembly structured to filter reductant includes an outer housing and an inner housing. The inner housing is positioned within the outer housing. The inner housing is structured to contain the reductant. The inner housing includes an end face, a curved face, and a plurality of connecting ribs. The curved face is contiguous with the end face. Each of the plurality of connecting ribs extends over the curved face and onto the end face. Each of the plurality of connecting ribs joins with at least one of the others of the plurality of connecting ribs on the end face.

In still another embodiment, a filtration assembly structured to filter reductant includes an outer housing and an inner housing. The inner housing is positioned within the outer housing. The inner housing is structured to contain the reductant and operable between a first state in which the inner housing has a first volume and a second state in which the inner housing has a second volume that is larger than the first volume. At least a portion of the inner housing is separated from the outer housing when the inner housing is in the first state and interfaces with the outer housing when the inner housing is in the second state.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
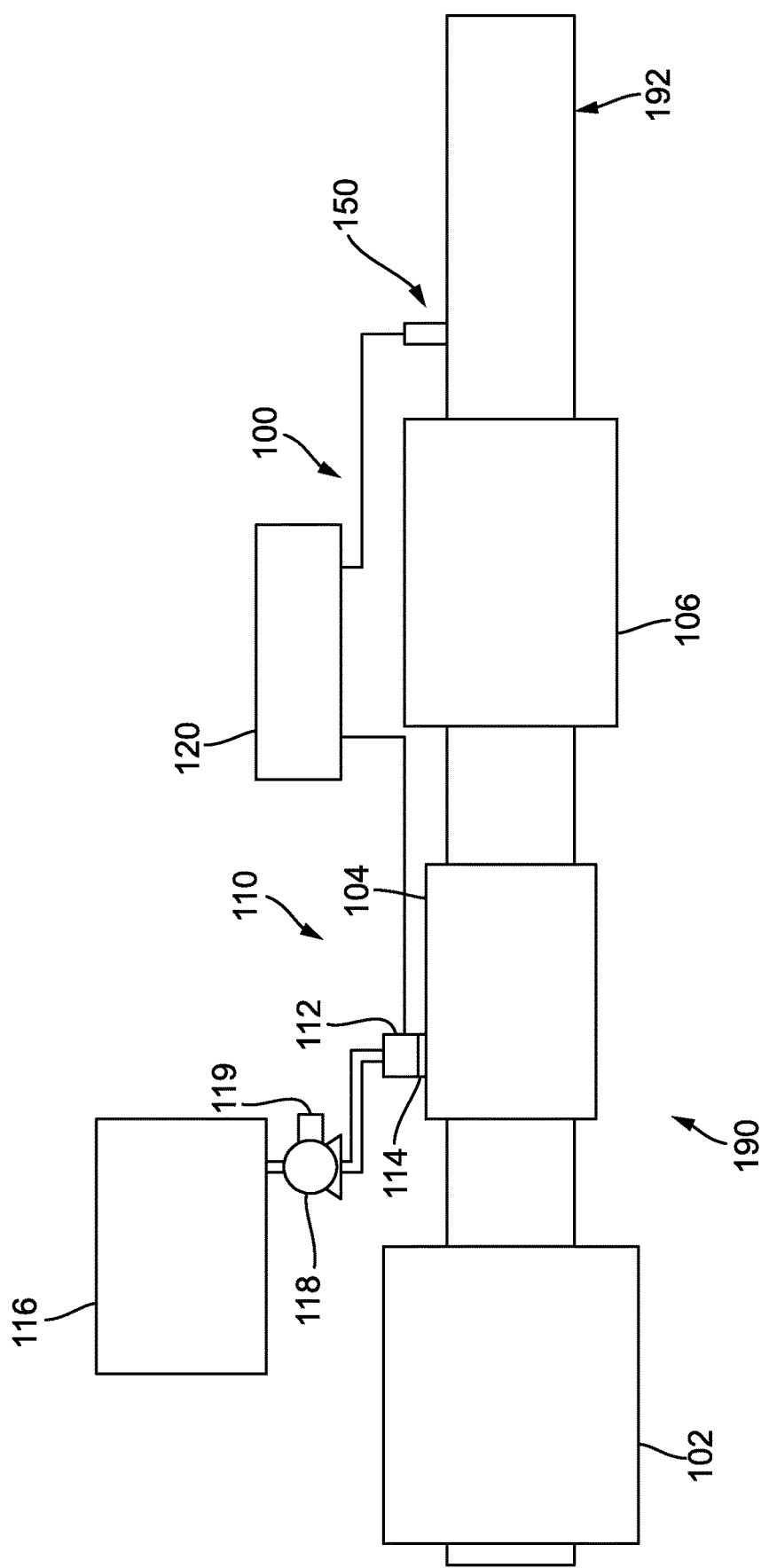
FIG. 1 is a block schematic diagram of an example aftertreatment system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for filtering reductant within an aftertreatment system of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a doser within an aftertreatment system. Dosers typically treat exhaust gases using a reductant. The reductant is typically drawn from a tank by a pump and subsequently provided to the doser.

Some aftertreatment systems are non-purging. In these aftertreatment systems, the reductant is not removed from the pump and/or doser at key-off events. As a result, the reductant may remain stagnant for extended periods of time (e.g., between a key-off event and a key-on event, etc.). The reductant may freeze or gel when stagnant and exposed to relatively cold temperatures. Accordingly, the reductant may tend freeze in the pump and/or doser in some aftertreatment systems. As the reductant freezes, it expands. Accordingly, the pump and/or doser typically facilitates this expansion to avoid being susceptible to damage.

One component where the reductant may freeze in this aftertreatment systems is a filter positioned within the pump and/or doser. To compensate for the expansion of the reductant, the filter may include a foam component that is compressed by the expansion of the reductant and that expands to return to its initial shape as the reductant thaws. These filters suffer from several significant drawbacks. First, the foam components are relatively expensive, thereby increasing the cost of operating the aftertreatment system. Second, the foam components may cause internal portions of the filter to become unseated (e.g., dislodged, etc.), thereby leading to undesirable operation of the filter. Third, the foam component has a useful life that is difficult to determine. Finally, the foam component is susceptible to damage at relatively high temperatures, thereby prohibiting the use of the aftertreatment system in relatively high temperatures.

Implementations described herein relate to a filtration assembly that does not include a foam component and instead utilizes a fluid (e.g., air, etc.) gap between an inner housing that selectively expands within an outer housing. The inner housing may expand as reductant therein freezes, causing a fluid (e.g., air, etc.) from the fluid gap to be expelled from the outer housing, and may contract as reductant therein thaws, causing the fluid to be drawn into the fluid gap through the outer housing. The filtration assembly described herein utilizes a structural interaction between the outer housing, the inner housing, and a filter positioned therein to ensure that the filter remains seated despite freezing and thawing of reductant in the inner housing. Additionally, the filtration assembly described herein is capable of being less expensive and more desirable than filters with a foam component because the filtration assembly described herein does not utilize a foam component.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber 104 (e.g., reactor, reactor pipe, etc.), a SCR catalyst 106, and a sensor 150.

The DPF 102 is configured to (e.g., structured to, able to, etc.) remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 104 includes a reductant delivery system 110 having a doser or dosing module 112 configured to dose the reductant into the decomposition chamber 104 (for example, via an injector). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant source 116. The reductant source 116 may include multiple reductant sources 116. The reductant source 116 may be, for example, a diesel exhaust fluid tank containing Adblue®.

A supply unit or pump 118 is used to pressurize the reductant from the reductant source 116 for delivery to the dosing module 112. In some embodiments, the pump 118 is pressure controlled (e.g., controlled to obtain a target pressure, etc.). The pump 118 includes a filter 119. The filter 119 filters (e.g., strains, etc.) the reductant prior to the reductant being provided to internal components (e.g., pistons, vanes, etc.) of the pump 118. For example, the filter 119 may inhibit or prevent the transmission of solids (e.g., solidified reductant, contaminants, etc.) to the internal components of the pump 118. In this way, the filter 119 may facilitate prolonged desirable operation of the pump 118. In some embodiments, the pump 118 is coupled to a chassis of a vehicle associated with the aftertreatment system 100.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example, a diesel oxidation catalyst (DOC)) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the aforementioned positions of the exhaust system 190.

III. Example Aftertreatment System Including an Auxiliary Dosing Module

Figure 2:
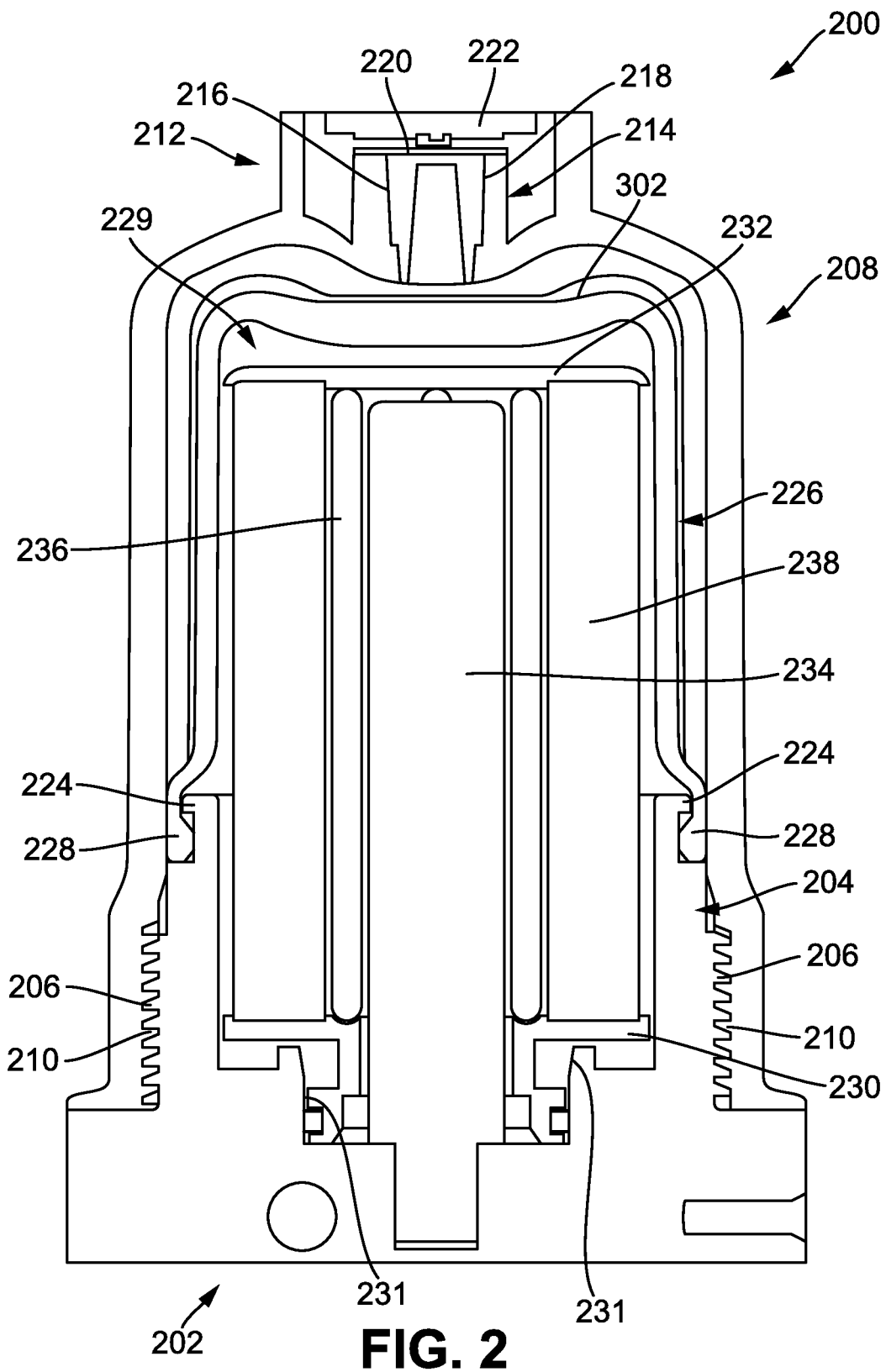
FIG. 2 is a cross-sectional view of an example filtration assembly for use in an aftertreatment system, such as the example aftertreatment system shown in FIG. 1, in a first state.
Figure 3:
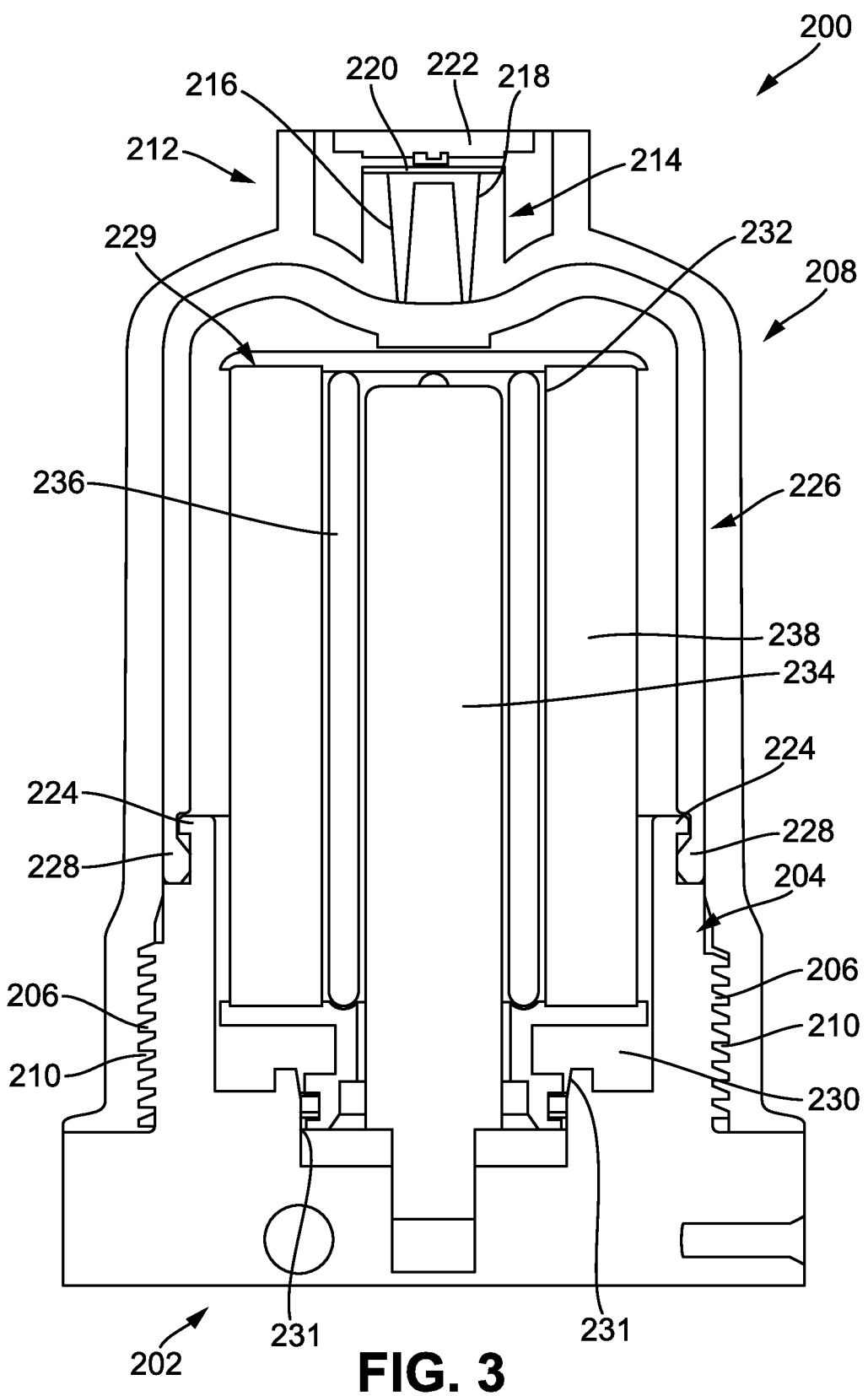
FIG. 3 is a cross-sectional view of an example filtration assembly for use in an aftertreatment system, such as the example aftertreatment system shown in FIG. 1, in a second state.

FIGS. 2 and 3 depict an example filtration assembly 200. The filtration assembly 200 may function as the filter 119 previously described. The filtration assembly 200 is implemented in a non-purging aftertreatment system (e.g., the aftertreatment system 100, etc.). In a non-purging aftertreatment system, reductant is not removed from various components of the system, such as the filtration assembly 200, at key-off events (e.g., when an internal combustion engine having the system is turned off, etc.). During these key-off events, the reductant in the non-purging aftertreatment system may freeze (e.g., in cold environments, in frigid temperatures, etc.). For example, the reductant in the filtration assembly 200 may freeze at temperatures of less than −7 degrees Celsius (e.g., −11 degrees Celsius, etc.).

When reductant freezes (e.g., solidifies, gels, etc.), the reductant expands in volume. For example, the reductant may experience an increase (e.g., compared to a volume of the reductant entirely as a liquid, etc.) in volume of between 7 and 9 percent, inclusive, when the reductant freezes. Unlike many conventional filters, the filtration assembly 200 is configured to facilitate expansion and contraction of the reductant while avoiding damage of to the filtration assembly and maintaining desirable operation of the associated aftertreatment system after the reductant has thawed. As a result, the filtration assembly 200 avoids exposure to relatively high forces from the expansion of the reductant that can damage many conventional filtration assemblies.

The filtration assembly 200 includes a base 202. The base 202 may be coupled to a chassis of a vehicle associated with the aftertreatment system 100. For example, the base 202 may be fastened to the chassis of the vehicle having the aftertreatment system 100. The base 202 includes a receptacle 204 (e.g., receiver, coupler, fitting, etc.). The receptacle 204 is an annular protrusion extending from the base 202. The receptacle 204 includes a threaded interface 206. The threaded interface 206 may extend continuously or discontinuously about the receptacle 204.

The filtration assembly 200 also includes an outer housing 208. As will be described in more detail herein, the outer housing 208 is configured to cover (e.g., shield, protect, encapsulate, etc.) various components of the filtration assembly 200. In an example embodiment, the outer housing 208 is constructed from a rigid material (e.g., hard plastic, metal, aluminum, stainless steel, etc.). The outer housing 208 includes a threaded interface 210. The threaded interface 210 of the outer housing 208 is configured to cooperate with the threaded interface 206 of the receptacle 204 to couple the outer housing 208 to the receptacle 204 and therefore to the base 202. In this way, the outer housing 208 may be threaded onto the receptacle 204. In various applications, the outer housing 208 may be unthreaded from the receptacle 204 to facilitate access to interior components of the filtration assembly 200. For example, the outer housing 208 may be unthreaded, and subsequently removed from, the receptacle 204 such that interior components of the filtration assembly 200 may be serviced, cleaned, and/or replaced.

The outer housing 208 includes a protrusion 212 (e.g., annular protrusion, etc.) extending from the outer housing 208. The protrusion 212 is positioned at an end of the outer housing 208. The outer housing 208 also includes a post 214 (e.g., protrusion, pillar, etc.) positioned within the protrusion 212 and extending from the outer housing 208. The post 214 defines a first passage 216 (e.g., passageway, channel, runner, duct, etc.) and a second passage 218 extending through the post 214. The first passage 216 and the second passage 218 facilitate fluid communication through the outer housing 208. In this way, fluid outside of the outer housing 208 may be transmitted into the outer housing 208, and vice versa. The first passage 216 and the second passage 218 may facilitate pressure equalization of the filtration assembly 200 (e.g., relative to an ambient condition external to the outer housing 208, etc.) such that pressure does not substantially build up within the outer housing 208.

The outer housing 208 includes an inner membrane 220 (e.g., barrier, filter, etc.) positioned on, and coupled to, the top of the post 214. Fluid passes through the inner membrane 220 before flowing into, or flowing from, the first passage 216 and/or the second passage 218. The inner membrane 220 may be defined by a porosity (e.g., number of pores per unit area, number of pores per unit volume, etc.) related to a maximum flow rate of fluid through the inner membrane 220 and a maximum fluid droplet size that may pass through the inner membrane 220. In this way, the inner membrane 220 may, for example, inhibit or substantially prevent the transmission of water into the outer housing 208 while simultaneously facilitating the transmission of air out of the outer housing 208.

The outer housing 208 also includes an cover 222 (e.g., barrier, filter, etc.) coupled to the protrusion 212 and positioned above the inner membrane 220. The cover 222 facilitates the transmission of air through the cover 222 (e.g., is permeable to air, is air permeable, etc.) but inhibits or prevents the transmission of liquids and/or solids through the cover 222 (e.g., is impervious to liquid, is liquid impervious, etc.). For example, the cover 222 may inhibit or prevent debris (e.g., dirt, organic debris, leafs, branches, wood, ice, snow, etc.) from passing through the inner membrane 220 while simultaneously facilitating the transfer of air through the inner membrane 220. The receptacle 204 also includes a retainer 224. The retainer 224 extends continuously or discontinuously about the receptacle 204.

The filtration assembly 200 also includes an inner housing 226 coupled to the receptacle 204. In an example embodiment, the inner housing 226 is constructed from an elastic or flexible material (e.g., soft plastic, rubber, neoprene, etc.). The inner housing 226 may be configured to have a relatively low elongation (e.g., longitudinal elongation, etc.) at a target pressure associated with a maximum volume of the reductant within the filtration assembly 200. The inner housing 226 is configured to expand when reductant within the inner housing 226 freezes such that a portion of the inner housing 226 may be received in (e.g., interfaces with, etc.) the outer housing 208. The inner housing 226 includes a flange 228 that is selectively coupled to the retainer 224. For example, the inner housing 226 may be centered relative to the receptacle 204 and pressed onto the base 202 such that the flange 228 snaps into, and is subsequently retained by, the retainer 224.

An air gap is present between the outer housing 208 and the inner housing 226 when the inner housing 226 is coupled to the receptacle 204 and the outer housing 208 is coupled to the receptacle 204. The air gap may be occupied by air or any other similar fluid. It is understood that while air is primarily discussed herein, other similar fluids are similarly described and implemented. The air gap between the inner housing 226 and the outer housing 208 may have various shapes, sizes, and configurations such that the filtration assembly 200 may be tailored for a target application. For example, the air gap may extend circumferentially and azimuthally about the inner housing 226. In some examples, the inner housing 226 and the outer housing 208 are configured such that the inner housing 226 does not contact the outer housing 208.

The air gap between the inner housing 226 and the outer housing 208 facilitates expansion of the inner housing 226. In other words, the inner housing 226 may be selectively expanded into the air gap towards the outer housing 208. The inner housing 226 is configured to selectively contain reductant and to facilitate the expansion of the reductant within the inner housing 226. For example, when a temperature of an environment within which the aftertreatment system 100 is operated is below a threshold (e.g., a freezing point of the reductant, etc.), reductant that is present within the inner housing 226 freezes and therefore expands.

The inner housing 226 is operable between a first state (e.g., a contracted state, a natural state, etc.), as shown in FIG. 2, and a second state (e.g., an expanded state, etc.), as shown in FIG. 3. When the inner housing 226 expands (e.g., as the inner housing 226 transitions from the first state to the second state, etc.), such as when reductant within the inner housing 226 freezes or when a pressure within the inner housing 226 increases (e.g., due to operation of the aftertreatment system, etc.), air from the air gap between the inner housing 226 and the outer housing 208 is forced from the first passage 216 and the second passage 218 and subsequently through the cover 222, thereby mitigating any pressure build up in the air grab between the inner housing 226 and the outer housing 208. Air is substantially prevented from flowing into the inner housing 226 when the inner housing 226 expands because air is capable of flowing out of the first passage 216 and the second passage 218 and subsequently out of the inner membrane 220 and the cover 222. In this way, the filtration assembly 200 inhibits or substantially prevents air from outside of the inner housing 226 from mixing with the reductant inside of the inner housing 226 while facilitating expansion and contraction of the inner housing 226 to compensate for freezing and thawing of the reductant within the inner housing 226.

When the inner housing 226 contracts (e.g., as the inner housing 226 transitions from the second state to the first state, etc.), such as when reductant within the inner housing 226 thaws, air from outside of the cover 222 is drawn through the cover 222, through the first passage 216 and the second passage 218, and into the air gap between the inner housing 226 and the outer housing 208, thereby substantially preventing the formation of any vacuum between the inner housing 226 and the outer housing 208.

The inner housing 226 and the outer housing 208 are configured such that the air gap between the inner housing 226 and the outer housing 208 has a target volume. The target volume of the air gap is related to a maximum volume of the reductant within the filtration assembly 200 (e.g., within the inner housing 226, etc.) and/or a maximum volume of the reductant within a supply unit (e.g., the pump 118, etc.) associated with the filtration assembly 200. In various embodiments, the inner housing 226 and the outer housing 208 are configured such that the air gap between the inner housing 226 and the outer housing 208 is maintained when the maximum volume of reductant is presented within the filtration assembly 200 (e.g., when all of the reductant within the inner housing 226 has frozen, etc.). In this way, a structural integrity of the inner housing 226 is preserved and operation of the filtration assembly 200 may continue in a desirable manner after the reductant has thawed, despite prior freezing of the reductant within the filtration assembly 200.

The filtration assembly 200 includes a filter 229 that is configured to filter reductant. The filter 229 includes a lower endplate 230 (e.g., cap, endcap, etc.) positioned within the receptacle 204 and interfacing with the base 202. Specifically, the lower endplate 230 interfaces with a rim 231 of the receptacle 204. The lower endplate 230 includes an O-ring providing a seal between the lower endplate 230 and the rim 231.

The filter 229 also includes a upper endplate 232 (e.g., cap, endcap, etc.) positioned within the inner housing 226. The upper endplate 232 may interface with the inner housing 226. For example, as the reductant within the filter 229 freezes, the upper endplate 232 may contact the inner housing 226. Contact between the upper endplate 232 and the inner housing 226 may cause the inner housing 226 to contact the outer housing 208. The filtration assembly 200 (e.g., the lower endplate 230, the upper endplate 232, the inner housing 226, the outer housing 208, etc.) is configured such that the lower endplate 230 remains positioned (e.g., seated, contained, etc.) within the rim 231 as the inner housing 226 variously transitions between the first state and the second state. In this way, the filter 229 remains seated within the receptacle 204 as the reductant within the inner housing 226 freezes and thaws. For example, as the reductant within the inner housing 226 freezes, the lower endplate 230 may move within the rim 231 which may simultaneously cause the upper endplate 232 to contact the inner housing 226, and the inner housing 226 to contact the outer housing 208, thereby preventing further movement of the lower endplate 230 out of the rim 231. In various embodiments, the upper endplate 232 is rounded, chamfered, or otherwise configured such that interfacing between the upper endplate 232 and the inner housing 226 does not cause any substantial structural damage (e.g., wear, etc.) to the inner housing 226.

The filter 229 also includes a first filter media 234 coupled to the base 202 and positioned within the lower endplate 230. The first filter media 234 is configured to filter reductant and is defined by a porosity. The first porosity is associated with a maximum fluid droplet size that may pass through the first filter media 234. The first filter media 234 may be, for example, a pleated filter media or a corrugated filter media. The first filter media 234 may include, for example, a plurality of axially elongated tetrahedron channels.

The filter 229 also includes a column support 236. The column support 236 is coupled to the lower endplate 230 and the upper endplate 232. For example, the column support 236 may be overmolded onto the lower endplate 230 and the upper endplate 232. The column support 236 has a length that is configured to maintain the seating of the lower endplate 230 in the rim 231. The column support 236 may additionally interface with the first filter media 234 and may function to retain the first filter media 234 with respect to the lower endplate 230 and the upper endplate 232. The column support 236 facilitates passage of the reductant therethrough. For example, the column support 236 may include a mesh wall through which the reductant may freely pass.

The filter 229 also includes a second filter media 238 interfacing with the lower endplate 230 and the upper endplate 232. For example, the lower endplate 230 and the upper endplate 232 may be overmolded onto the lower endplate 230 and the upper endplate 232. The second filter media 238 is configured to filter reductant and is defined by a porosity. The porosity is associated with a maximum fluid droplet size that may pass through the second filter media 238. The porosity of the second filter media 238 may be the same as, or different from, the porosity of the first filter media 234. The second filter media 238 may be, for example, a pleated filter media or a corrugated filter media. The second filter media 238 may include, for example, a plurality of axially elongated tetrahedron channels. The second filter media 238 may be the same as, or different from, the first filter media 234.

In one operation, reductant may be routed from the base 202 into the first filter media 234, through the first filter media 234, through the column support 236, through the second filter media 238, between the second filter media 238, the lower endplate 230, and/or the upper endplate 232 and the inner housing 226 and/or the receptacle 204, and out of the receptacle 204. In another operation, reductant may be routed from the receptacle 204 between the second filter media 238, the lower endplate 230, and/or the upper endplate 232 and the inner housing 226 and/or the receptacle 204, through the second filter media 238, through the column support 236, through the first filter media 234, and out of the base 202.

The interaction between the threaded interface 206 of the receptacle 204 and the threaded interface 210 of the outer housing 208 retains the inner housing 226 within the outer housing 208, and thereby inhibits or prevents push-out of the filter 229 from the receptacle 204. In this way, the outer housing 208 maintains desirable operation of the filtration assembly 200 when, for example, the reductant within the filter 229 freezes. In contrast, many conventional filters do not contain an outer housing and instead only have a single housing which may become unintentionally dislodged or disconnected, thereby being susceptible to push-out of components within the single housing and a corresponding failure of the conventional filter.

Figure 4:
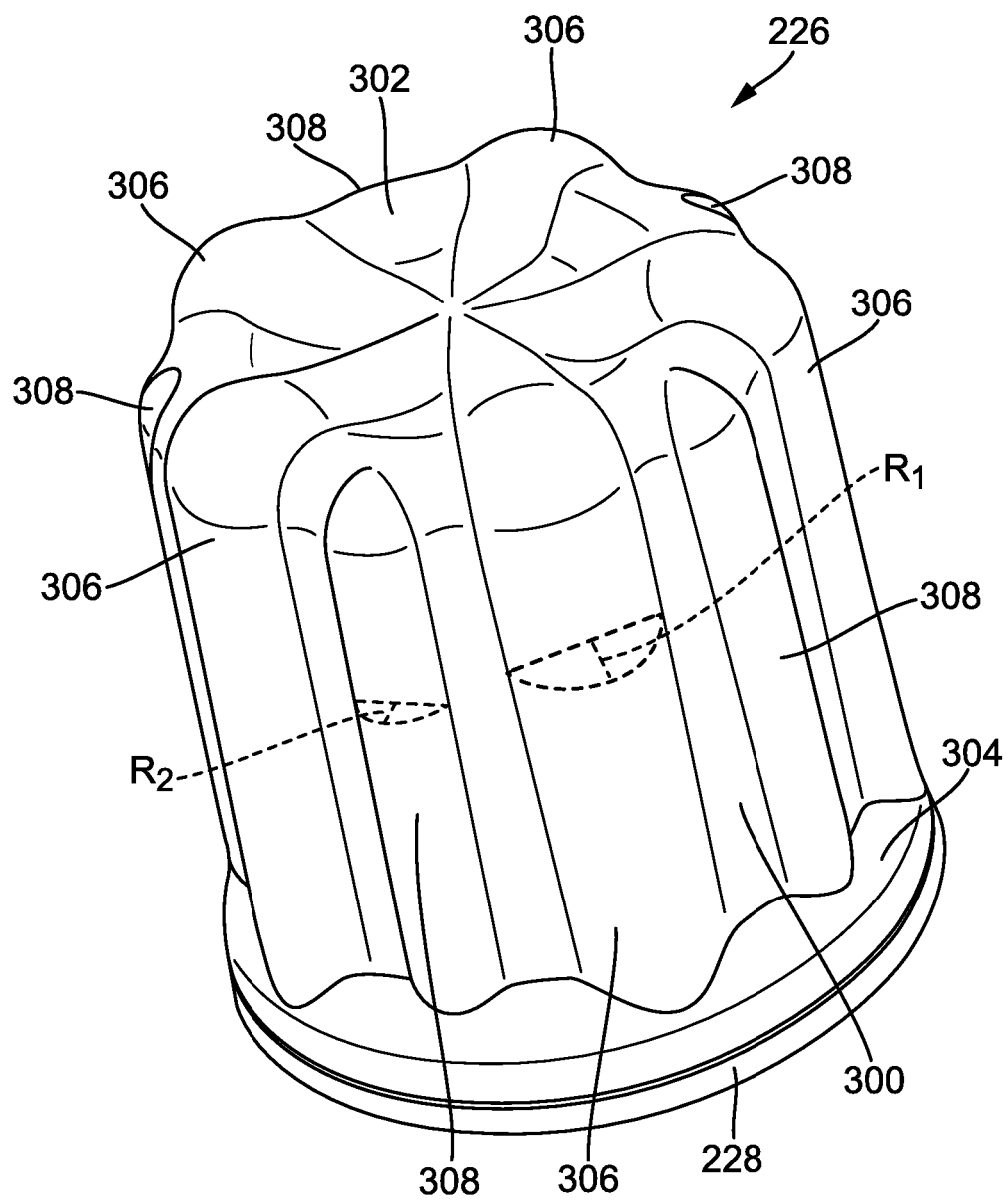
FIG. 4 is a perspective view of an example inner housing for the example filtration assembly shown in FIG. 2.

FIG. 4 illustrates the inner housing 226 in greater detail. As shown in FIG. 4, the inner housing 226 includes a curved face 300 and an end face 302 contiguous with the curved face 300. The inner housing 226 also includes a lip 304 that is of a wider diameter than the curved face 300 and contiguous with the curved face 300 and the flange 228.

The inner housing 226 also includes a plurality of connecting ribs 306. Each of the plurality of connecting ribs 306 extends from the lip 304 across the curved face 300 and across the end face 302. In some embodiments, each of the plurality of connecting ribs 306 is joined at a nexus disposed on the end face 302. In other embodiments, at least one of the plurality of connecting ribs 306 terminates on the end face 302 separate from the others of the plurality of connecting ribs 306. In an example embodiment, the inner housing 226 includes five connecting ribs 306. However, the inner housing 226 may include one, two, three, six, eight, or other numbers of the connecting ribs 306.

The inner housing 226 also includes a plurality of intermediate ribs 308. Each of the plurality of intermediate ribs 308 extends from the lip 304 across the curved face 300 to the end face 302. Each of the plurality of intermediate ribs 308 is interspaced between an adjacent pair of the plurality of connecting ribs 306. In an example embodiment, the inner housing 226 includes five intermediate ribs 308. However, the inner housing 226 may include one, two, three, six, eight, or other numbers of the intermediate ribs 308.

The plurality of connecting ribs 306 and the plurality of intermediate ribs 308 cooperate to facilitate expansion of the inner housing 226 (e.g., into the gap between the outer housing 208 and the inner housing 226, etc.) while retaining stiffness of the inner housing 226. The stiffness provided by the plurality of connecting ribs 306 and the plurality of intermediate ribs 308 biases the inner housing 226 to the first state (e.g., the contracted state, the natural state, etc.), thereby maintaining desirable operation of the inner housing 226 after frozen reductant within the inner housing 226 has thawed.

Each of the plurality of connecting ribs 306 and each of the plurality of intermediate ribs 308 protrudes from the inner housing 226. Portions of each of the plurality of connecting ribs 306 are received in the outer housing 208. For example, the outer housing 208 may include a plurality of grooves each configured to receive a portion of one of the plurality of connecting ribs 306.

Each of the plurality of connecting ribs 306 is defined by a first radius of curvature, $R_1$, and each of the plurality of intermediate ribs 308 is defined by a second radius of curvature, $R_2$. In an example embodiment, the plurality of connecting ribs 306 and the plurality of intermediate ribs 308 are configured such that the first radius of curvature, $R_1$, is different from the second radius of curvature, $R_2$. For example, the plurality of connecting ribs 306 and the plurality of intermediate ribs 308 may be configured such that the first radius of curvature, $R_1$, is larger than the second radius of curvature, $R_2$.

Some conventional filters utilize a foam component. This foam component may be compressed when reductant freezes and may decompress when reductant thaws. However, utilizing such a design is disadvantageous for many reasons.

First, this foam is relatively expensive. As a result, conventional filters that utilize a foam component are relatively expensive. An important consideration in the design of the filtration assembly 200 is cost. The filtration assembly 200 does not include a foam component and is therefore more desirable than some conventional filters that utilize a foam component because the filtration assembly 200 is relatively less expensive.

Additionally, the foam utilized by conventional filters has a useful life that is difficult to determine. After the useful life, this foam may break down and thereafter be unable to be compressed and decompressed. Accordingly, it is important to know the useful life of this foam. Unfortunately, it is difficult to accurately predict the useful life of this foam in an economical fashion. The filtration assembly 200 has a relatively long useful life that can be determined based on, for example, the configuration of the inner housing 226. Accordingly, the filtration assembly 200 is more desirable than conventional filters that utilize a foam component.

Furthermore, the foam utilized in some conventional filters can be damaged at elevated temperatures, such as temperatures above eighty degrees Celsius. Accordingly, conventional filters which utilize a foam component cannot be utilized in many applications which require exposure to higher temperatures (e.g., eight-five degrees Celsius, one-hundred and five degrees Celsius, etc.). In contrast, the filtration assembly 200 may be utilized in temperatures in excess of one-hundred and five degrees Celsius and is therefore capable of being utilized in many more applications than a conventional filter which utilize a foam component. Accordingly, the filtration assembly 200 is more desirable than conventional filters that utilize a foam component because the filtration assembly 200 can be utilized in relatively high temperature applications (where utilization of a foam component is not desirable).

Compression of this foam can cause a filter element to become unseated. Conventional filters which utilize a foam component may not be configured to provide a structural interaction that limits movement of the filter element and thereby inhibits or prevents unseating of the filter element when reductant freezes. As a result, conventional filters which utilize a foam component are susceptible to instances where the filter element becomes unintentionally unseated, thereby causing the conventional filters to be undesirable. In contrast, the filtration assembly 200 utilizes a structural interaction between the receptacle 204, the lower endplate 230, the rim 231, the upper endplate 232, the column support 236, the inner housing 226, and the outer housing 208 to ensure that the lower endplate 230 remains seated in the rim 231 when reductant in the inner housing 226 freezes, thereby ensuring desirable operation of the filtration assembly 200. Accordingly, the filtration assembly 200 is more desirable than conventional filters that utilize a foam component.

In an example embodiment, none of the plurality of intermediate ribs 308 extend onto the end face 302. However, in other embodiments, the plurality of intermediate ribs 308 extend onto the end face 302 such that each of the plurality of intermediate ribs 308 is not contiguous (e.g., is discontinuous, etc.) with any others of the plurality of intermediate ribs 308 and any of the plurality of connecting ribs 306. In still another embodiment, the inner housing 226 does not include any intermediate ribs 308 and only includes the plurality of connecting ribs 306. In one embodiment, the inner housing 226 does not include any connecting ribs 306 and only includes the plurality of intermediate ribs 308. In some embodiments, the inner housing 226 does not include any intermediate ribs 308 between at least one adjacent pair of the plurality of connecting ribs 306. In one embodiment, the inner housing 226 includes a plurality of the plurality of intermediate ribs 308 between at least one adjacent pair of the plurality of connecting ribs 306.

IV. Construction of Exemplary Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid, such as exhaust, water, air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another. While the reductant is described as "freezing" herein, it is understood that the concept of "freezing" includes partial solidification of the reductant. Partial solidification of the reductant may occur when, for example, the reductant is an aqueous solution and the water in the reductant at least partially solidifies.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A filtration assembly structured to filter reductant, the filtration assembly comprising:
    an outer housing; and
    an inner housing positioned within the outer housing, the inner housing structured to contain the reductant and operable between a first state in which the inner housing has a first volume and a second state in which the inner housing has a second volume that is larger than the first volume, the inner housing comprising a curved face, and an end face contiguous with the curved face;
    wherein the inner housing is separated from the outer housing by an air gap when the inner housing is in the first state;
    wherein a volume of the air gap decreases as the inner housing transitions from the first state to the second state and increases as the inner housing transitions from the second state to the first state;
    wherein the end face is separated from the outer housing when the inner housing is in the first state; and
    wherein the end face interfaces with the outer housing at a position along a central axis of the inner housing when the inner housing is in the second state.

2. The filtration assembly of claim 1, wherein:
the outer housing comprises a passage structured to transmit a fluid into the outer housing and out of the outer housing; and
the filtration assembly is configured such that the fluid is transmitted out of the outer housing as the inner housing transitions from the first state to the second state and such that the fluid is transmitted into the outer housing as the inner housing transitions from the second state to the first state.

3. The filtration assembly of claim 2, further comprising:
a cover structured to transmit the fluid therethrough and to inhibit transmission of liquids therethrough;
wherein the cover is coupled to the outer housing proximate the passage such that the fluid transmitted into the outer housing and out of the outer housing flows through the cover; and
wherein the cover is structured to inhibit transmission of liquids through the passage and into the outer housing.

4. The filtration assembly of claim 2, wherein the passage is positioned within the outer housing adjacent the end face of the inner housing.

5. The filtration assembly of claim 1, wherein:
the inner housing is configured to transition from the first state to the second state when the reductant within the inner housing transitions from a liquid state to a frozen state; and
the inner housing is configured to transition from the second state to the first state when the reductant within the inner housing transitions from the frozen state to the liquid state.

6. The filtration assembly of claim 1, further comprising:
a base coupled to the outer housing and the inner housing;
a filter positioned within the inner housing and coupled to the base, the filter structured to filter the reductant and comprising:
a column support;
a lower endplate coupled to the column support; and
an upper endplate coupled to the column support opposite the lower endplate;
wherein the base comprises a receptacle having a rim; and
wherein the lower endplate is retained within the receptacle such that the lower endplate interfaces with the rim when the inner housing is in the first state and when the inner housing is in the second state.

7. The filtration assembly of claim 1, wherein the inner housing further comprises:
a plurality of connecting ribs, each of the plurality of connecting ribs extending over the curved face and onto the end face and each of the plurality of connecting ribs joining with the others of the plurality of connecting ribs on the end face.

8. The filtration assembly of claim 7, wherein the inner housing further comprises a plurality of intermediate ribs, each of the plurality of intermediate ribs extending over the curved face and each of the plurality of intermediate ribs positioned between an adjacent pair of the plurality of connecting ribs.

9. The filtration assembly of claim 8, wherein:
each of the plurality of connecting ribs is defined by a first radius of curvature;
each of the plurality of intermediate ribs is defined by a second radius of curvature; and
the first radius of curvature is greater than the second radius of curvature.

10. A filtration assembly structured to filter reductant, the filtration assembly comprising:
an outer housing; and
an inner housing positioned within the outer housing, the inner housing structured to contain the reductant, the inner housing comprising:
an end face;
a curved face contiguous with the end face; and
a plurality of connecting ribs, each of the plurality of connecting ribs extending over the curved face and onto the end face, and each of the plurality of connecting ribs joining with at least one of the others of the plurality of connecting ribs on the end face.

11. The filtration assembly of claim 10, wherein the inner housing further comprises a plurality of intermediate ribs, each of the plurality of intermediate ribs extending over the curved face and each of the plurality of intermediate ribs positioned between an adjacent pair of the plurality of connecting ribs.

12. The filtration assembly of claim 11, wherein:
each of the plurality of connecting ribs is defined by a first radius of curvature;
each of the plurality of intermediate ribs is defined by a second radius of curvature; and
the first radius of curvature is greater than the second radius of curvature.

13. The filtration assembly of claim 10, wherein:
the inner housing is operable between a first state in which the inner housing has a first volume and a second state in which the inner housing has a second volume that is larger than the first volume;
each of the plurality of connecting ribs is separated from the outer housing when the inner housing is in the first state;
each of the plurality of connecting ribs interfaces with the outer housing when the inner housing is in the second state;
the outer housing comprises a passage structured to transmit a fluid into the outer housing and out of the outer housing; and
the filtration assembly is configured such that the fluid is transmitted out of the outer housing as the inner housing transitions from the first state to the second state and such that the fluid is transmitted into the outer housing as the inner housing transitions from the second state to the first state.

14. The filtration assembly of claim 13, wherein:
the inner housing is configured to transition from the first state to the second state when the reductant within the inner housing transitions from a liquid state to a frozen state; and
the inner housing is configured to transition from the second state to the first state when the reductant within the inner housing transitions from the frozen state to the liquid state.

15. The filtration assembly of claim 13, further comprising:
a base coupled to the outer housing and the inner housing;
a filter positioned within the inner housing and coupled to the base, the filter structured to filter the reductant and comprising:
a column support;
a lower endplate coupled to the column support; and
an upper endplate coupled to the column support opposite the lower endplate;

wherein the base comprises a receptacle having a rim; and
wherein the lower endplate is retained within the receptacle such that the lower endplate interfaces with the rim when the inner housing is in the first state and when the inner housing is in the second state.

16. A filtration assembly structured to filter reductant, the filtration assembly comprising:
an outer housing; and
an inner housing positioned within the outer housing, the inner housing structured to contain the reductant and operable between a first state in which the inner housing has a first volume and a second state in which the inner housing has a second volume that is larger than the first volume, the inner housing comprising:
an end face,
a curved face contiguous with the end face, and
a plurality of connecting ribs, each of the plurality of connecting ribs extending over the curved face and onto the end face;
wherein at least a portion of the inner housing is separated from the outer housing when the inner housing is in the first state and interfaces with the outer housing when the inner housing is in the second state.

17. The filtration assembly of claim 16, wherein:
the inner housing is configured to transition from the first state to the second state when the reductant within the inner housing transitions from a liquid state to a frozen state; and
the inner housing is configured to transition from the second state to the first state when the reductant within the inner housing transitions from the frozen state to the liquid state.

18. The filtration assembly of claim 16, wherein the inner housing further comprises a plurality of intermediate ribs, each of the plurality of intermediate ribs extending over the curved face and each of the plurality of intermediate ribs positioned between an adjacent pair of the plurality of connecting ribs.

* * * * *